G. F. WAKEFIELD.
AUTO TAIL LAMP SIGNAL.
APPLICATION FILED DEC. 27, 1915.

1,210,024.

Patented Dec. 26, 1916.
2 SHEETS—SHEET 1.

WITNESSES:
Charles Pickles
Thos Lestberg

INVENTOR
George F. Wakefield
BY Strong & Townsend,
ATTORNEYS

G. F. WAKEFIELD.
AUTO TAIL LAMP SIGNAL.
APPLICATION FILED DEC. 27, 1915.

1,210,024.

Patented Dec. 26, 1916.

UNITED STATES PATENT OFFICE.

GEORGE F. WAKEFIELD, OF SAN JOSE, CALIFORNIA.

AUTO TAIL-LAMP SIGNAL.

1,210,024.   Specification of Letters Patent.   Patented Dec. 26, 1916.

Application filed December 27, 1915. Serial No. 68,716.

*To all whom it may concern:*

Be it known that I, GEORGE F. WAKEFIELD, a citizen of the United States, residing at San Jose, in the county of Santa Clara and State of California, have invented new and useful Improvements in Auto Tail-Lamp Signals, of which the following is a specification.

My invention relates to improvements in signaling apparatus, and is especially designed to be applied to the rear end of automobiles and like vehicles for the purpose of indicating to following vehicles the actions contemplated by the vehicle carrying the light. Thus it may show that the machine will turn to the right or to the left, or will stop.

The invention comprises an electrically driven mechanism, with signal shutters so attached as to be operated thereby to indicate the actions of the vehicle.

It also comprises details of construction which will be more fully explained by reference to the accompanying drawings, in which—

Figure 1:
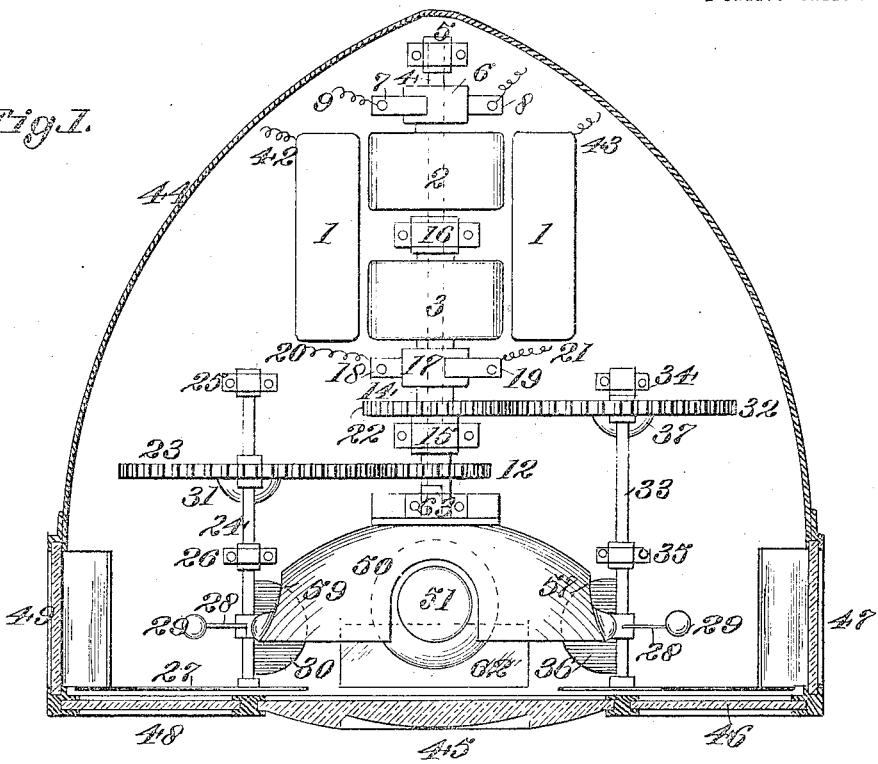
Figure 2:
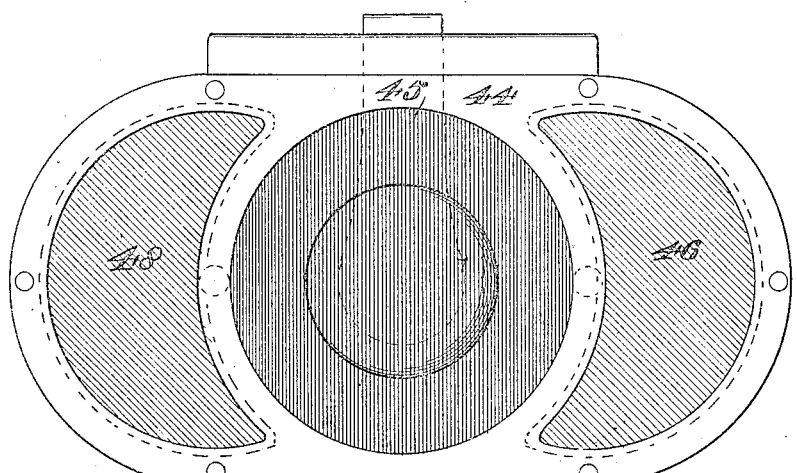
Figure 3:
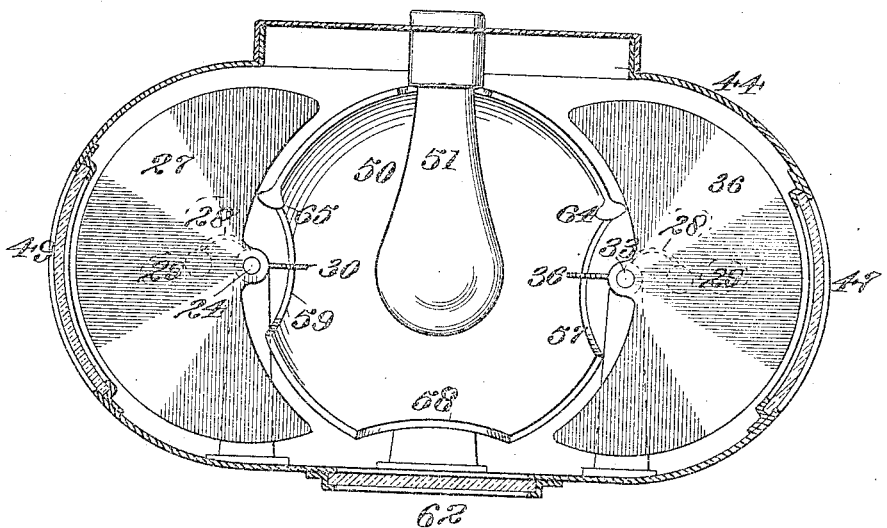

Figure 1 is a top plan view of the mechanism. Fig. 2 is a rear view of the same. Fig. 3 is a view of the signal bell in the lamp case.

As shown in the drawings, 44 represents an outside metal case having apertures 45, 46, 47, 48, 49 and 62 for glass lights, of which 47, 49 and 62 may be of clear glass, 45 of red and 46 and 48 of either clear or light colored glass, and the latter may be, if desired, of dissimilar color.

In Fig. 1 is shown a compound electric motor, in which there are two separate armatures with their commutators attached to two separate and independent axles, but having only one magnetic field common to both and more particularly described as follows: 2 is an armature with its commutator 6, and brushes 7 and 8 attached to a solid axle 4 running in ball or other bearings, as at 5 and 63. 3 is a second armature with its commutator 17 and brushes 18 and 19. It has current wires 20 and 21 leading one to a controlling device and the other to a magnetic field. This second armature and commutator are attached to a hollow axle 14 turnable in bearings 15 and 16. This axle has an inside diameter large enough to admit the first-named axle 4, so that the latter may revolve within this outer axle and without any frictional interference. Thus the two may revolve in either direction or both may revolve in opposite directions at the same time. 1 is a magnetic field of sufficient length to extend over armatures 2 and 3 and thereby be able to produce electromotive force in either of said armatures or in both at the same time, as may be desired. 43 is a conducting wire from the battery or generator and thence to the controlling device. Attached to the axle 4 is a toothed wheel 12 meshing with a toothed wheel 23, on which is attached a signal axle 24 running in bearings 25 and 26. Fastened to the end of this signal axle is a thin sheet 27, of metal or other material, forming a shutter and here shown as of crescent shape, although any other desired shape may be employed. This shutter is attached to the axle 24 and revolves with it. The outside or visible face of the shutter may be of any desired color so that it can be readily seen through the opening 48 when thus exposed. 28 is a curved metal spring having one end fastened to the axle 24 and the other end to a metal clapper or striker 29, which, when the axle revolves, will strike a bell 50. Notches 57, 58 and 59 are cut out of the edges of the bell to allow the rays from the lamp 51 to pass through and out of the openings in the case 44. A thin sheet of metal 30 is attached to and above the axle 24 for the purpose of interrupting more or less of the rays from the electric light 51, as they pass toward the side opening 49 when the axle is revolving. A counterweight 31 is attached to the gear wheel 23 which will retain the signal shutters in their proper normal position and which, at night, would allow the rays from the lamp 51 to be unobstructed when passing toward the side opening 49, at the same time the rays of light will be prevented from passing through the opening 48. A toothed wheel 22 is attached to the hollow axle 14, which wheel is in gear with the toothed wheel 32 fastened to the axle 33, and having approximately the same diameter as its counterpart 23. This axle is turnable in suitable bearings, as at 34 and 35. 37 is a counterweight attached to the wheel 32 for the same purpose as the part 31 on wheel 23. 61 is a shutter of metal attached to the axle 33 for the same purpose as the shutter 30 upon the axle 24. Shutter 36 is attached to shaft 33 and is similar to shutter 30 and performs the same function on the right side as 30 does on the left. The circular openings or notches 59 and 57 in the bell 50 have their center points below a horizontal line drawn through the center of the signal bell, so that the clappers, when revolving, will not strike the bell on the lower edges but will strike it upon the upper edges 64 and 65.

The motor controller circuits for controlling the shutter mechanisms operate as follows: The current flows through the field 1—1 always in the same direction. The current is switched through the commutator 6 to cause the armature 2 to turn in one direction to actuate the shutters 27 and 30 and the clapper 29 associated therewith.
The current is switched through the commutator 17 to cause the armature 3 to turn in the other direction to actuate the shutters 36 and 61 and associated clapper 29. The current is switched through both commutators 6 and 17 simultaneously to turn both armatures 2 and 3 at once to actuate the shutters 27 and 30 and associated clapper 29 and the shutters 36 and 61 and associated clapper 29 at the same time.
In order to give a visible indication to a person behind the vehicle of the direction of movement of the vehicle the operation will be as follows: When the conveyance is to turn to the left the closing of the current to the rear armature and magnetic field will cause the armature 2 to revolve counterclockwise and with it its axle 4 and connections, which causes the clapper 29 to strike the bell at lip 65 and at the same time the shutter 30 will partially cut off the rays of light passing through the opening 49 and shutter 27 will open the aperture 48 and allow the rays from the lamp 51 to pass through, while at the same time it will partially close the central or red light opening 45. If the vehicle is to turn to the right the circuit to armature 3 and the magnetic field may be closed, thus causing the armature, with its axle 14 and attached gear wheel 22, to revolve clockwise and the gear wheel 32, with its attached bell clapper 29 and shutters, to revolve counter-clockwise. This will cause the right hand clapper 29 to strike lip 64, and at the same time shutter 61 will partially cut off the rays of light passing through opening 47 and shutter 36 will open aperture 46 and permit rays from lamp 51 to pass through, while at the same time it will partially close the central or red opening 45.

Having thus described my invention, what I claim and desire to secure by Letters Patent is—

1. In an automobile direction and like indicator, a closed case having an interior lamp and openings with glazing to expose the light, a motor having contiguous armatures mounted upon concentrically journaled shafts, pinions upon the motor shafts, parallel shafts having gears, one of each engaging with one of the motor shaft pinions, disks fixed upon said gear shafts and adapted to revolve and intercept light to the glazed openings, and switch connections to control the movements of the motor.

2. An automobile tail light and movement indicator, including a casing having indicating openings, an inclosed light, a motor, shafts and connected gearing, disks mounted thereon and controlled to expose or conceal the light through the openings, a bell within the casing, and hammers carried by the gear shafts and acting to give audible signals in unison with the visible ones.

3. In an automobile direction and like indicator, an inclosing casing having a central colored tail light, and crescent shaped opaque disks fixed to parallel shafts at opposite sides of the center, said disks being turnable to register with the central portion and expose the crescent cut-away portions for the passage of light.

4. In an automobile direction and like indicator, an inclosing casing having a central colored tail light, crescent shaped opaque disks fixed to parallel shafts at opposite sides of the center, said disks being turnable to register with the central portion and expose the crescent cut-away portions for the passage of light, and means whereby the disks are returned to their normal positions when the power is cut off.

5. In an automobile tail light and direction indicator of the character described, a closed case having a central rear opening and colored tail light, parallel glazed openings upon either side, crescent shaped, opaque disks, shafts upon which said disks are mounted and revoluble so that either crescent may register with and obscure the exterior openings or be turned to expose said openings, an electric motor and gearing by which the disks may be independently revolved, and weighted means to return the disks to their normal condition.

6. In an automobile signal, a lamp provided with a tail light opening, an opening for a light adapted to indicate one direction, and an opening for a light adapted to indicate another direction, said tail light opening being normally uncovered, said direction light openings being normally covered, means for uncovering each of said direction light openings to indicate the desired direction and for uncovering both of said direction light openings and covering said tail light opening to indicate another condition.

7. In an automobile signal, a lamp provided with an opening for a tail-light, an opening for a light indicating one direction, an opening for a light for indicating another direction, said tail light being normally uncovered, said direction light openings being normally covered, means for uncovering each of said direction light openings to indicate the desired direction, and for uncovering both of said direction light openings and covering said tail light opening to indicate another condition, a bell, and means for ringing said bell each time the signal is actuated.

8. In an automobile signal, a lamp provided with an opening for a tail light, an opening for a light indicating one direction, an opening for a light for indicating another direction, said tail light opening being normally uncovered, said direction light openings being normally covered, means for uncovering each of said direction light openings to indicate the desired direction, and for uncovering both of said direction light openings and covering said tail light opening to indicate another condition, additional side light openings and means for interrupting a side light each time a direction light opening is uncovered.

9. In an automobile signal, a lamp provided with an opening for a tail light, an opening for a light for indicating one direction, an opening for a light for indicating another direction, said tail light opening being normally uncovered, said direction light openings being normally covered, means for uncovering each of said direction light openings to indicate the desired direction, and for uncovering both of said direction light openings and covering said light tail opening to indicate another condition, additional side light openings, means for interrupting a side light each time a direction light opening is uncovered, and for interrupting both of said side lights when both of said direction light openings are uncovered.

10. In an automobile signal, a lamp provided with an opening for a tail light, an opening for a light indicating one direction, an opening for a light for indicating another direction, said tail light opening being normally uncovered, said direction light openings being normally covered, means for uncovering each of said direction light openings, and covering said tail light opening to indicate another condition, and an electrical control for said signal.

11. In an automobile signal, a lamp provided with an opening for a tail light, an opening for a light for indicating one direction, an opening for a light for indicating another direction, said tail light opening being normally uncovered, said direction light openings being normally covered, means for uncovering each of said direction light openings to indicate the desired direction, and for uncovering both of said direction light openings, and covering said tail lamp to indicate another condition, a bell, means for ringing said bell each time the signal is actuated, and an electrical control for the signal.

12. In an automobile signal, a lamp provided with an opening for a tail light, an opening for a light indicating one direction, an opening for a light indicating another direction, said tail light openings being normally uncovered, said direction light openings being normally covered, means for uncovering each of said light openings to indicate the desired direction, and for uncovering both of said direction light openings, and covering said tail light openings to indicate another condition, additional side light opening means for interrupting a side light each time a direction light opening is uncovered, and an electrical control for the signal.

13. In an automobile signal, a lamp provided with a tail light opening, an opening for a light indicating one direction, an opening for a light indicating another direction, said tail light opening being normally uncovered, said direction light openings being normally covered, means for uncovering each of said direction light openings to indicate the desired direction, and for uncovering both of said direction light openings and covering said tail light opening to indicate another condition, additional side light openings, means for interrupting a side light each time a direction light opening is uncovered, and for interrupting both of said lights when both of said direction light openings are uncovered, and an electrical control for the signal.

In testimony whereof I have hereunto set my hand in the presence of two subscribing witnesses.

GEORGE F. WAKEFIELD.

Witnesses:
  HOWARD W. COWELL,
  ELMER J. WARE.